United States Patent [19]

Kirigaya

[11] Patent Number: 5,028,942

[45] Date of Patent: Jul. 2, 1991

[54] PHOTOGRAPHIC DATA RECORDING APPARATUS

[75] Inventor: Tadayuki Kirigaya, Tokyo, Japan

[73] Assignee: Asahi Kogaku Kogyo Kabushiki Kaisha, Tokyo, Japan

[21] Appl. No.: 421,099

[22] Filed: Oct. 13, 1989

[30] Foreign Application Priority Data

Oct. 18, 1988 [JP] Japan ................................ 63-262328

[51] Int. Cl.$^5$ ............................................. G03B 17/24
[52] U.S. Cl. ................................................. 354/106
[58] Field of Search ......................... 354/105, 106, 109

[56] References Cited

U.S. PATENT DOCUMENTS 4,384,786  5/1983  Kuroda .................................. 355/40
4,519,701  5/1985  Kanaoka et al. ..................... 355/39
4,664,491  5/1987  Kazumi et al. ..................... 354/105

FOREIGN PATENT DOCUMENTS 0031568  7/1981  European Pat. Off. .
0033909  8/1981  European Pat. Off. .
0263351  4/1988  European Pat. Off. .

*Primary Examiner*—Michael L. Gellner
*Attorney, Agent, or Firm*—Sandler, Greenblum & Bernstein

[57] ABSTRACT

An apparatus for recording photographic data including a storing device for storing the photographic data of each frame of film, and a recording device for exposing the photographic data stored in the storing means on a predetermined frame of the film.

10 Claims, 8 Drawing Sheets

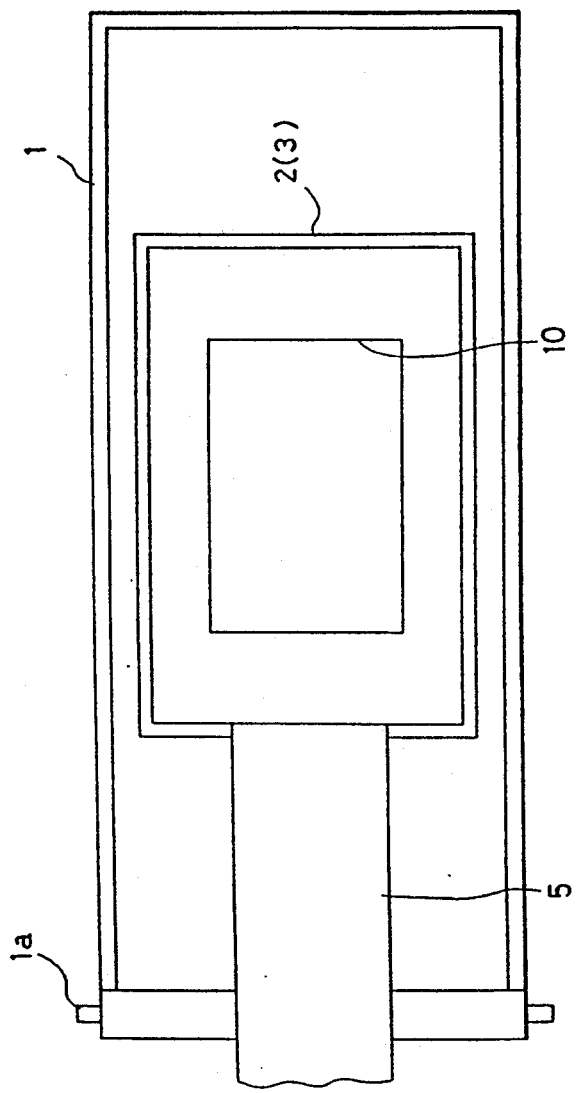
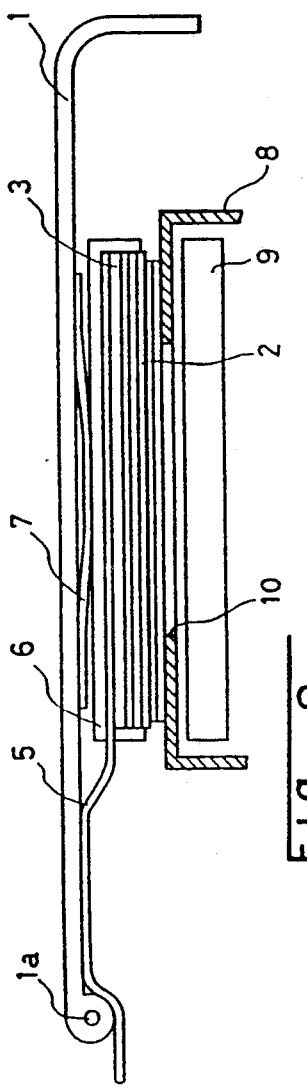
Fig-1
Fig-2

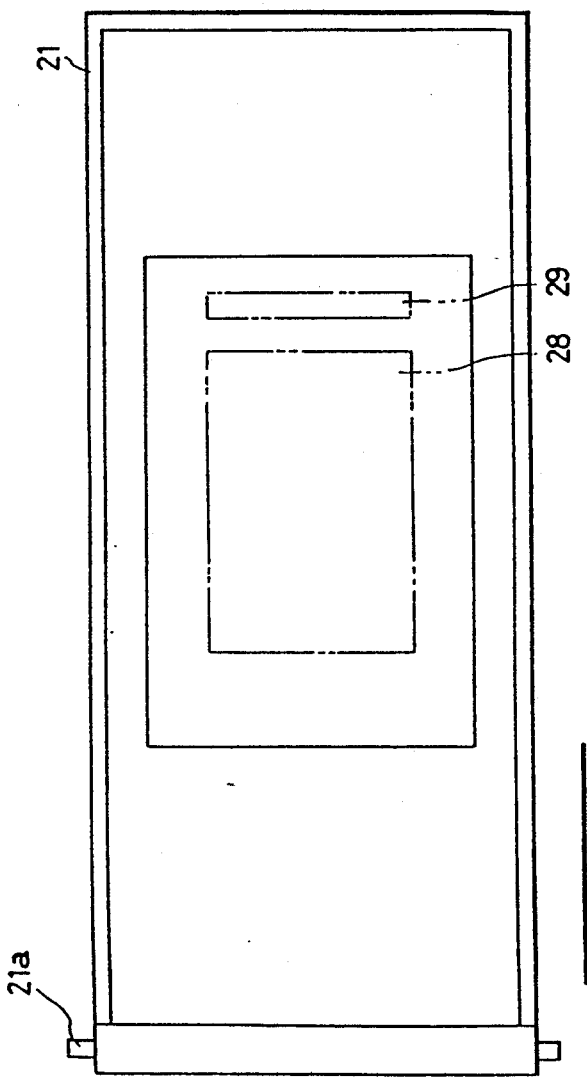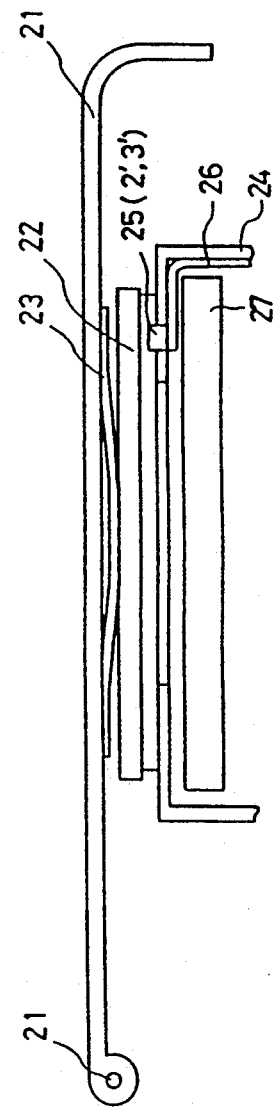

| FRAME No. | DATE (OR HOUR AND MINUTE) | DIAPHRAGM | SHUTTER SPEED | FOCAL LENGTH | EXPOSURE CORRECTING VALUE |
|---|---|---|---|---|---|
| 1 | 07 05 | 5.6 | 2000 | 135 | +1.5 |
| 2 | 07 05 | 8.0 | 1000 | 105 | 0 |
| 3 | | | | | |
| 4 | | | | | |
| 5 | | | | | |
| 6 | | | | | |
| 7 | | | | | |
| 8 | | | | | |
| 9 | | | | | |
| 10 | | | | | |
| 11 | | | | | |
| 12 | | | | | |
| 13 | | | | | |
| 14 | | | | | |
| 15 | | | | | |
| 16 | | | | | |
| 17 | | | | | |
| 18 | | | | | |
| 19 | | | | | |
| 20 | | | | | |
| 21 | | | | | |
| 22 | | | | | |
| 23 | | | | | |
| 24 | | | | | |
| 25 | | | | | |
| 26 | | | | | |
| 27 | | | | | |
| 28 | | | | | |
| 29 | | | | | |
| 30 | | | | | |
| 31 | | | | | |
| 32 | | | | | |
| 33 | | | | | |
| 34 | | | | | |
| 35 | 07 25 | 16 | 4" | 28 | 0 |

Fig-8

PHOTOGRAPHIC DATA RECORDING APPARATUS

BACKGROUND OF THE INVENTION

1. Field of the Invention

The present invention relates to an apparatus for recording photographic data onto a film.

2. Description of Related Art

In a recent camera, a date upon which a photograph is taken is recorded on a picture.

In addition to such a date, photographic data of each picture, such as a shutter, a diaphragm value, a focal length, an exposure correcting value is sometimes needed to be recorded. A camera is not available in which such photographic data is automatically recorded on the film. Namely, such photographic data may be manually written in a separate notebook or the like for each picture by a photographer, which is, however troublesome. Furthermore, there is a possibility that the notebook on which necessary data is written is lost. Also, a photographer sometimes forgets to record the photographic data.

There are various concepts for recording the photographic data.

In a first concept, photographic data is recorded on each frame of a film, similarly to the recording of the data. However, in this method, many numerical figures of the photographic data or the like, which are recorded in the picture, spoil the picture, resulting in a decreased artistry.

In a second concept, to solve the problems of the first method, the photographic data is recorded on the portion of a film between the frames or in the vicinity of perforations of a film. In this method, the photographic data has no adverse influence on artistry, since the data does not substantially appear in the picture. However, in case of a reversal mount, (i.e., a slide) no one can see the photographic data.

In third concept, the photographic data is recorded or stored on a separate recording medium, such as an IC card and is reproduced by a reproducing device. However, in this method, a maintenance problem of the IC cards is raised. It is also possible to print out the stored photographic data to maintain the photographic data. However, there is no correlation of the photographic data and the film.

SUMMARY OF THE INVENTION

The primary object of the present invention is to provide a photographic data recording apparatus which solves the above-mentioned problems and which can identify the photographic data to a film.

To eliminate the problems mentioned above, in the basic concept of the present invention, the photographic data of each frame of a film is successively stored and is recorded on a final frame or any optional frame of a film.

To achieve the object mentioned above, according to the present invention, there is provided an apparatus for recording photographic data comprising storing means for storing the photographic data of each film frame, and recording means for exposing the photographic data stored in the storing means on a predetermined frame of the film.

The recording means comprises means for indicating all of a photographic data stored in the storing means at one time, means for exposing the photographic data indicated by the indicating means on the film, and means for controlling the indication means and the exposure means when a predetermined frame on which the photographic data is to be recorded comes to a predetermined position.

With this arrangement, all of the photographic data photographed on an optional film can be recorded on the film at one time.

Preferably, the recording means comprises means for feeding a film, means located perpendicularly to the direction of the travel of the film for indicating divided photographic data stored in a storing means, means for exposing the photographic data indicated by the indicating means on a film, and means for controlling the indicating means and the exposure means when a predetermined frame on which the photographic data is to be recorded comes to a predetermined position and for controlling the film feeding means so as to intermittently feed the film in accordance with the operation of the indicating means and the exposure means.

Preferably, the indicating means and the exposure means comprise a pressure plate or a part thereof which is provided within a back cover of a camera body, resulting in a realization of a small and compact camera.

In one embodiment of the present invention, the control means comprises a DX code reading means for reading a DX code of a film cartridge, so that a frame on which the photographic data is to be recorded can be automatically recognized in accordance with the number of frames of film which is read by the DX reading means.

BRIEF DESCRIPTION OF THE DRAWINGS

The invention will be described below in detail with reference to the accompanying drawings, in which;

FIG. 1 is a front elevational view of a back cover having an indicating means and an exposure means provided thereon, according to the present invention;

FIG. 2 is a horizontal sectional view of a back cover shown in FIG. 1;

FIG. 4 is a front elevational view of a back cover having an indicating means and an exposure means provided thereon, according to another embodiment of the present invention;

FIG. 5 is a horizontal sectional view of a back cover shown in FIG. 4;

FIG. 8 is a schematic view showing an example of a record form of photographic data, in a photographic data recording apparatus according to the present invention; and, FIGS. 9, 10 and 11 are flow charts of a control unit of a photographic data recording apparatus according to the present invention.

DESCRIPTION OF PREFERRED EMBODIMENTS

Figure 3:
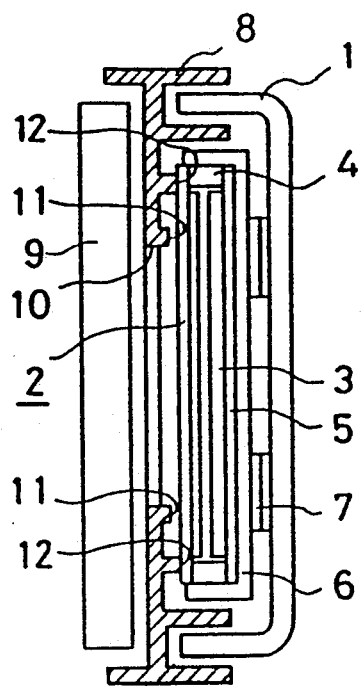
FIG. 3 is a vertical sectional view of a back cover shown in FIG. 1.

FIGS. 1 through 3 show a first embodiment of a photographic data recording apparatus according to the present invention.

Back cover 1 is pivoted to a camera body 8 by a shaft 1a. The camera body 8 has a shutter 9 which is located in front of an aperture 10. In the rear of the aperture 10 are arranged an inner rail 11 and an outer rail 12 which defines a passage for a film, together with the back cover 1 and the inner rail 11.

An indicating means and an exposure means which constitutes a recording means, together with the indicating means, are supported on an outer frame 6 and are attached to the back cover 1 through a leaf spring 7. An LCD 2, which constitutes the indicating means, and a lighting plate 3, which constitutes the exposure means, serve also as a pressure plate. All of the photographic data of each frame of film, such as the date, shutter speed, diaphragm value, focal length, exposure correcting value etc. are indicated on the LCD 2. Namely, for instance, in case of 12 frames of film and 36 frames of film, all of the photographic data for 12 frames and 36 frames are indicated at one time, respectively. The lighting plate 3 is provided on the side of the LCD 2 adjacent to the back cover 1 to expose the photographic data onto the film. The LCD 2 is electrically connected to a flexible printed circuit board 5 (FPC board) through a conductive rubber 4. The lighting plate 3 is directly connected to the FPC board 5, so that when the lighting plate 3 emits light, the photographic data indicated in the LCD 2 exposed on the film. The range in which the photographic data is taken corresponds to the size of the aperture 10 defined by the shutter 9.

The LCD 2 and the lighting plate 3 are relatively covered by the outer frame 6, so that the LCD 2 and the lighting plate 3 are protected from being damaged due to a mechanical shock or the like.

Figure 6:
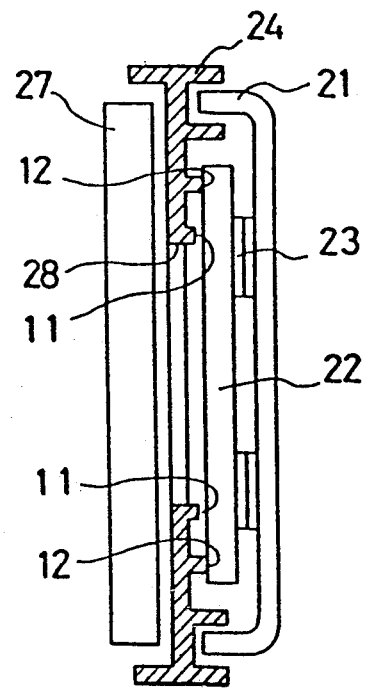
FIG. 6 is a vertical sectional view of a back cover shown in FIG. 4.

FIGS. 4 through 6 show another embodiment of a photographic data recording apparatus according to the present invention.

In the second embodiment shown in FIGS. 4-6, a taking device 25 which constitutes a recording means is attached to the camera body 24. The taking device 25 successively indicates and exposes divided photographic data for one film, including for example, date, shutter speed, diaphragm value, focal length, exposure correcting value etc. For instance, the photographic data of each frame or several frames is successively indicated in the taking device 25, regardless of the number of frames of one film, so that the indicated photographic data can be successively exposed onto the film. In the illustrated embodiment, the film is intermittently advanced by a displacement corresponding to the width of indication until all of the photographic data are exposed. The taking device 25 is composed of the LCD 2' and the lighting plate 3', similar to the first embodiment. The width of the taking device 25 is set so that the photographic data of one frame or a predetermined number of frames of film is indicated and taken. The LCD 2, 2' and the lighting plate 3, 3- can be replaced with an LED and another exposure means, respectively. The taking device 25 is located perpendicularly to the direction of the movement of the film.

The taking device 25 is connected to a control circuit (not shown) of the camera body 24 through a flexible printed circuit board 26. Pressure plate 22 is attached to the back cover 21, which is pivoted to the camera body 24 through a shaft 21a, through a pressure leaf spring 23. On the side of the taking device 25 adjacent to the lens is provided a shutter 27, so that taking range 29 of the photographic data is located beside the aperture 28 which is exposed by the shutter 27. The taking device 25 can be located adjacent to the pressure plate 22, similarly to the first embodiment. With this arrangement, a part of the recording means comprises a pressure plate in a common camera.

Figure 7:
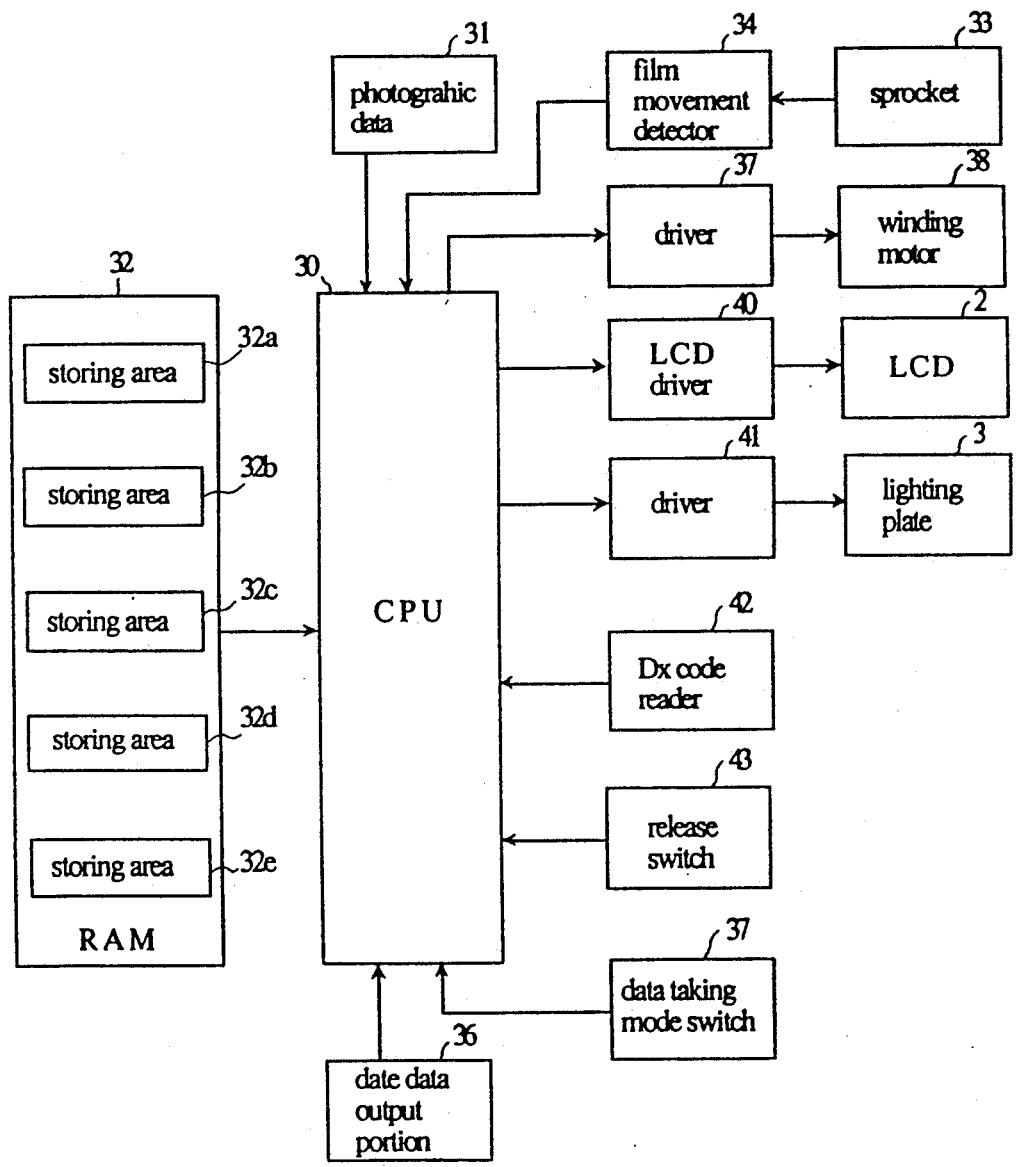
FIG. 7 is a block diagram of a control unit of a photographic data recording apparatus according to an aspect of the present invention.

FIG. 7 shows a control unit (circuit) of a photographic data recording apparatus according to the present invention.

As shown in FIG. 7, CPU 30 which generally controls the operation of the photographic data recording apparatus of the present invention and is connected to a RAM 32 which successively stores the photographic data 31 for each frame of a film in accordance with the kind of the photographic data. The photographic data of each frame of film, such as the date, shutter speed, diaphragm value, focal length, and exposure correcting value etc. are stored in the addressed storing areas 32a ~32e of the RAM 32.

To the CPU 30 are connected a date data output portion 36, which outputs data of the date and a data taking mode switch 37, which is actuated to expose the photographic data onto the film, i.e. to operate the photographic data recording apparatus of the present invention. Consequently, the data taking mode switch 37 can select a first mode in which only the date is taken for every frame of film, as in a common camera, and a second mode in which the photographic data for all of the frames of one film is taken in a final frame of film or an optional frame preceding thereto.

To the CPU 30 is connected a driver 39 which drives a film winding motor 38 which constitutes a film feeding means in accordance with the command of the CPU 30. A film movement detector 34, which detects the movement of the film by detecting the rotation of a sprocket 33 which rotates when the film is fed, is connected to the CPU 30, so that the data of movement of the film can be inputted to the CPU 30.

To the CPU 30 are also connected an LCD driver 40 which drives the LCD 2 as an indicating means and a driver 41 which drives the lighting plate 3 as an exposure means, so that the LCD 2 and the lighting plate 3 are actuated by the LCD driver 40 and the driver 41 in accordance with the command of the CPU 30, respectively.

A DX code reader 1 which reads a DX code of a cartridge and a release switch 43 which is actuated to start the photographing operation of the camera, are connected to the CPU 30.

The control unit as constructed above operates as follows:

When the film is loaded in the camera, the DX code of a film cartridge is read by the DX code reader 42 of the CPU 30, so that the CPU recognizes the kind of film, i.e. the number of frames of the loaded film to judge the frame NO. at which the photographic data is to be recorded.

After that, every time the release switch 43 is depressed, the CPU 30 reads the set date from the date data output portion 36, so that the date, the shutter speed, the diaphragm value, the focal length and the exposure correcting value etc. when the picture is taken is stored in the respective addressed storing areas 32a~32e of the RAM 32.

When the frame comes to a predetermined frame No. at which the photographic data is to be recorded, the CPU 30 prohibits a signal from being input thereto from the release switch 43. At the same time, the photographic data which is stored in the addressed storing areas 32a~32e of the RAM 32 is automatically indicated in the LCD 2, so that when the lighting plate 3 is turned ON to emit light, the indicated photographic data in the LCD 2 is exposed onto the film. As a result, the photographic data is recorded on the film, as shown in FIG. 8, which shows an example of a form of the recorded photographic data on the film.

The above discussion has been directed to the control of the first embodiment in which the photographic data for all of the frames of one film is recorded at one time. It is also possible to indicate the photographic data of each frame of film in the LCD 2 of the taking device 25 in order to successively expose the indicated photographic data for every frame of film, so that the photographic data of one film can be taken i.e., the (second embodiment illustrated in FIGS. 414 6). In this case, the film is intermittently advanced by a displacement corresponding to the width of the taking range of the photographic data by the film winding motor 38. Also in this alternative, the photographic data can be recorded in the form as shown in FIG. 8.

Figure 9:
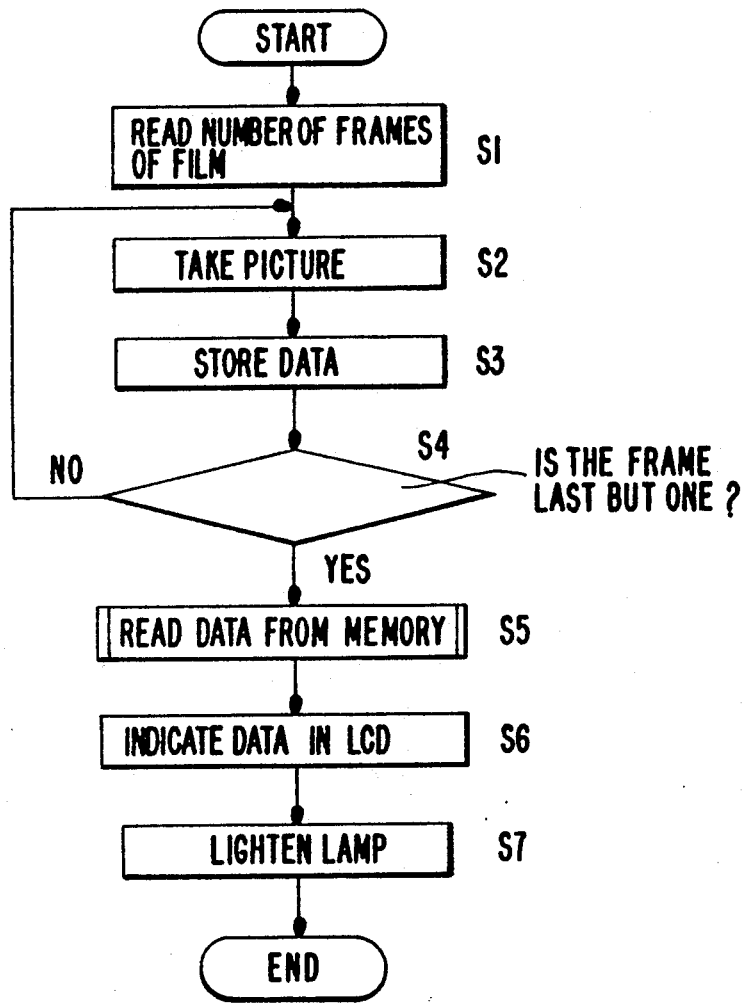
Figure 10:
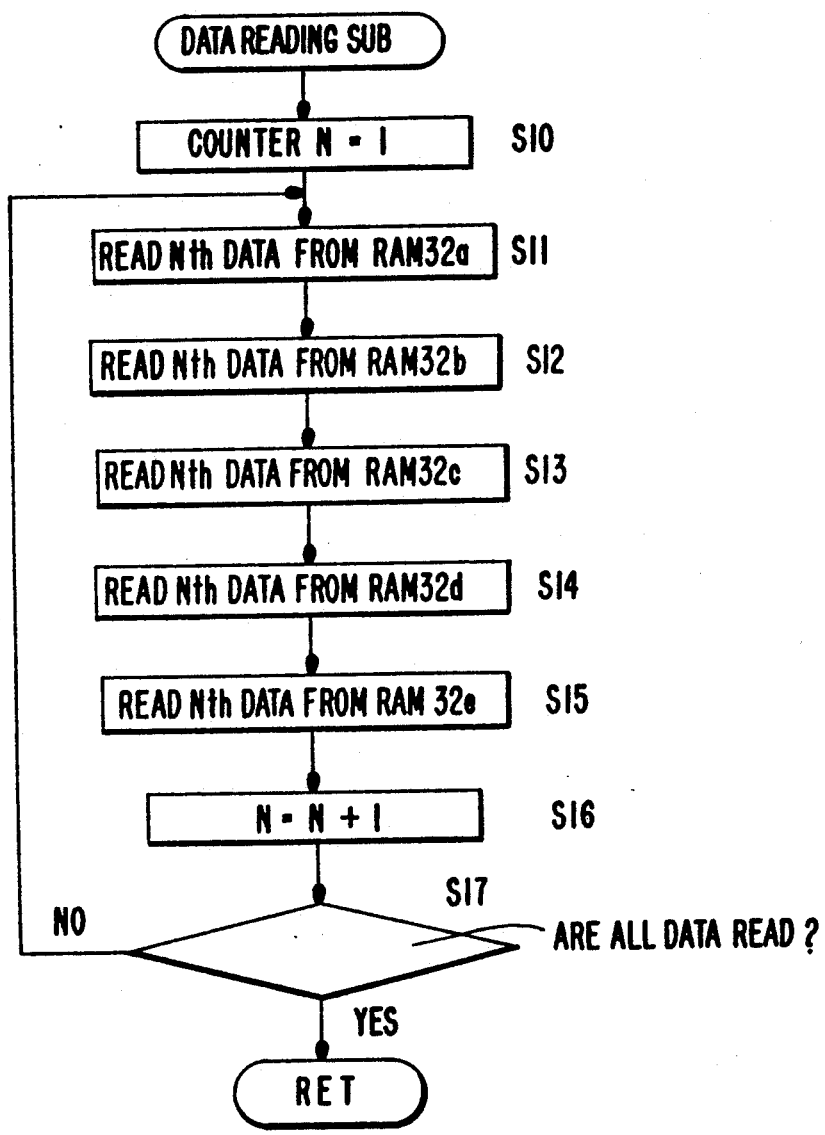
Figure 11:
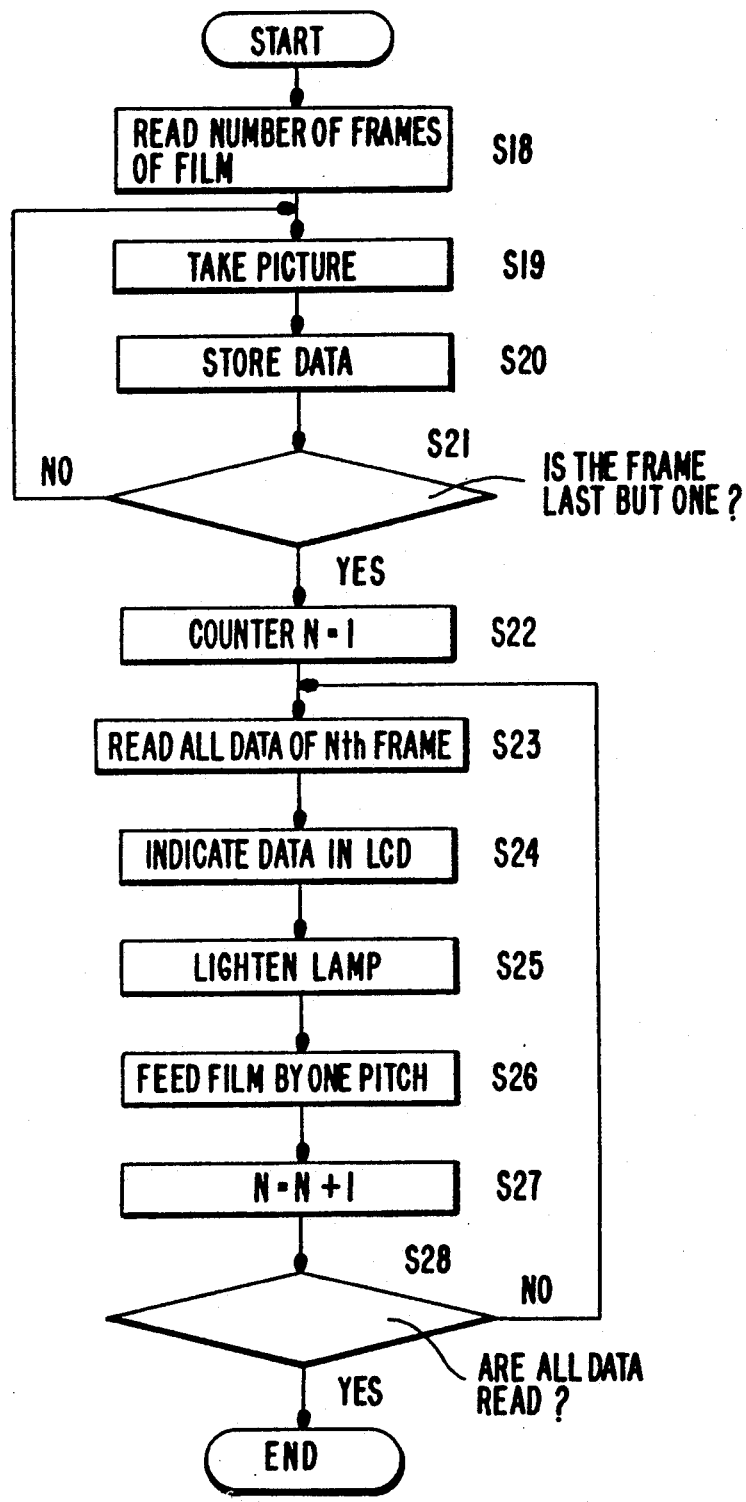

The following discussion will be directed to the detail of the operations of the components of the photographic data recording apparatus according to the present invention, with reference to FIGS. 9 through 11.

When the back cover 1 is closed after the film is charged, the CPU 30 judges the number of frames of the loaded film in accordance with the signal of the DX code reader 43 at step S1. Every time a picture is taken, the photographic data is recorded at steps S2 and S3. Then whether the present film number is the last one, i.e. whether the frame is the final frame is checked at step S4. For instance, in the case of a film having 36 frames, whether the frame is the 36th frame is checked (step S4). If the frame is the last frame, the CPU 30 successively reads the photographic data stored in the addressed storing areas 32a~32e of the RAM 32 in the order of the photographing to actuate the LCD driver 40 to indicate all the photographic data thus read out in the LCD 2 (steps S5 and S6). In this case, the shutter can not be actuated even if the release switch 43 is pushed down. When the indication is completed, the CPU 30 drives the driver 41 to turn ON the lighting plate 3 ON, so that the photographic data indicated in the LCD 2 can be exposed and recorded on the film (step S7).

FIG. 10 shows a sub-routine flow chart of step S3 of a main flow chart shown in FIG. 9. This sub-routine is a flow chart for reading the photographic data.

Upon reading the photographic data, the CPU 30 sets the data reading counter N to be 1 (step S10), and then the first photographic data stored in the storing areas 32a~32e of the RAM 32 is successively read to increase the value of the counter N by 1 (steps S11-S16). When the reading operations mentioned above are effected for all the frames of the film which are taken, the reading operation is finished (step S17).

FIG. 11 shows a flow chart of another control of a photographic data recording apparatus according to the present invention.

When the back cover 1 is closed after the film is loaded, the CPU 30 judges the kind (number of frames) of the loaded film from the DX code reader 43 (step S18). Every time a picture is taken, the photographic data is recorded and then whether the present film number is the last one, i.e. whether the frame is the final frame is checked. For instance, in the case of a film having 24 frames, whether the frame is the 24th frame is checked (steps S19, S20 and S21). If the frame is the last frame, the CPU 30 sets counter N to be 1 and successively reads the photographic data of the first frame stored in the addressed storing areas 32a~32e of the RAM 32 (steps S22 and S23). In this case, the shutter can not be actuated even if the release switch 43 is pushed down. After that, the CPU 30 operates the LCD driver 40 to indicate the photographic data thus read in the LCD 2' of the taking device 25 (step S24). When the indication is completed, the CPU 30 operates the driver 41 to turn ON the lighting plate 3' of the taking device 25, so that the photographic data indicated in the LCD 2 can be exposed and recorded in the film (step S25). After that, the CPU 30 actuates the driver 39 to drive the winding motor 38 so as to advance the film by a displacement (one pitch) corresponding to a width of record of the photographic data thereby to increase the value of the counter N by 1. When the operations from step S23 to step S27 are effected for all of the frames of film which are photographed, the recording operation of the photographic data is completed (steps S26-S28).

Although the above discussion has been applied to an embodiment in which the photographic data is recorded for every frame of film, the present invention is not limited thereto. For instance, the photographic data can be recorded for every two or three frames.

In the above discussion, it is assumed that the data taking mode switch 37 is turned ON. If the data taking mode switch 37 is not turned ON the above-mentioned operations are not performed.

In an alternative, the data taking mode switch 37 can be the release switch 43, so that if the release switch 43 is turned ON when the film comes to the last frame, the recording operation of the photographic data is effected and if the release switch 43 is turned ON when the film does not come to the last frame, the photographing can be effected as usual.

As can be understood from the foregoing, according to the present invention, since the photographic data of each frame of film is successively recorded, so that the photographic data of all frames can be recorded at one time on the last frame or an optional frame preceding thereto, the photographic data can be easily identified in connection with the used film, thus resulting in an improved maintenance of the photographic data.

We claim:

1. A apparatus for recording photographic data on film comprising means for storing photographic data for each frame of said film, and means for recording said photographic data stored in said storing means on a predetermined frame of said film which is not used for photographing.

2. An apparatus according to claim 1, wherein said recording means comprises means for indicating all of said photographic data stored in said storing means at one time, means for exposing said photographic data indicated by said indicating means on said film, and means for controlling said indicating means and said recording means when said film reaches a predetermined frame on which said photographic data is to be recorded.

3. An apparatus according to claim 1, wherein said recording means comprises means for feeding film, means located perpendicularly to the direction of travel of said film for indicating divided photographic data stored in said storing means, means for exposing said photographic data indicated by said indicating means on a film, and means for controlling the indicating means and said exposure means when said film comes to a predetermined frame on which said photographic data is to be recorded and for controlling said film feeding means to intermittently feed said film in accordance with the operation of said indicating means and said exposure means.

4. An apparatus according to claim 2, wherein said indicating means and said exposure means comprises at least a part of a pressure plate which is provided within a back cover of a camera body.

5. An apparatus according to claim 2, wherein said control means comprises a DX code reading means for reading a DX code of a patrone, so that a frame on which said photographic data is to be recorded can be automatically determined in accordance with the number of frames of film which is read by said DX reading means.

6. An apparatus for recording photographic data comprising means for recognizing a predetermined frame of a film on which said photographic data is to be recorded, and means for prohibiting a releasing operation of a shutter when said film reaches said predetermined frame of film.

7. An apparatus according to claim 6, further comprising means for recording said photographic data on a frame of film at which said shutter release is prohibited.

8. An apparatus for recording photographic data in a camera, said camera comprising an aperture which defines a photographing range, and recording means, located on one side of said aperture in the direction of advancing movement of film, for exposing said photographic data onto a frame of said film that is not used for photographing.

9. An apparatus according to claim 8, wherein said recording means is provided on a camera body.

10. An apparatus according to claim 8, wherein said camera has a pressure plate on which said recording means is provided.

* * * * *